United States Patent

[11] 3,629,800

[72] Inventor William A. Schneider
    Dallas, Tex.
[21] Appl. No. 859,002
[22] Filed Sept. 18, 1969
[45] Patented Dec. 21, 1971
[73] Assignee Texas Instruments Incorporated
    Dallas, Tex.
    Continuation of application Ser. No.
    559,811, June 23, 1966. This application
    Sept. 18, 1969, Ser. No. 859,002

[54] GAPPED DECONVOLUTION REVERBERATION REMOVAL
    12 Claims, 4 Drawing Figs.
[52] U.S. Cl. ........................................... 340/15.5
[51] Int. Cl. ........................................... G01v 1/36,
                                                     G01v 1/28
[50] Field of Search............................. 340/15.5
                                               CC, 15.5 TD

[56] References Cited
UNITED STATES PATENTS
3,417,370 12/1968 Brey............................. 340/15.5
3,496,530 2/1970 Brown et al.................. 340/15.5

Primary Examiner—Rodney D. Bennett, Jr.
Assistant Examiner—N. Moskowitz
Attorneys—James O. Dixon, Harold Levine, Andrew H. Hassell, Melvin Sharp and Rene E. Grossman ABSTRACT: Disclosed is a method of suppressing reverberatory energy in a seismic trace by subtracting from said trace a trace synthesized by time domain filtering said seismic trace, delayed by time, T, approximately equal to the two-way travel time of seismic energy in the reverberating medium, said filter parameters being defined by the matrix equation $Y_m=(X)^{-1}Z$ where $Z$ is the crosscorrelation coefficient function of a portion of the seismic trace within a truncated data gate and characterized by the reverberation energy, and a similar portion of the seismic trace delayed by a time $T$; $X$ is the autocorrelation coefficient function of that portion of the trace and $Y_m$ is the function designing filter weights.

INVENTOR:
WILLIAM A. SCHNEIDER

ATTORNEY

GAPPED DECONVOLUTION REVERBERATION REMOVAL

This is a continuation of the application of William A. Schneider, Ser. No. 559,811, filed June 23, 1966.

This invention relates to seismic exploration and more particularly to the removal of reverberations encountered in marine exploration by the use of gapped deconvolution operations for producing and employing a filter peculiarly related to the reverberation energy.

Geophysical prospecting is concerned primarily with the problem of locating and determining the nature of geological structures which are buried far below the surface of the earth. Geophysical prospecting methods are concerned with the measurement of various physical properties of the earth and the interpretation of such measurements.

Seismic prospecting is a primary method employed in geophysical exploration. As practiced, it consists essentially of the steps of initiating a disturbance in the earth's crust, and recording the resultant earth motion sensed at a number of spaced detector stations. The resultant recording or seismogram traditionally has taken the form of a plurality of galvanometer traces positioned side by side on a strip of photographic paper, and often is referred to as a wiggle trace recording. Such a record is readily examined visually. A particular seismic event on the record can be identified as a reflection from the subsurface beds by reason of time coincidence of high-amplitude similar waveforms. If the seismic velocity of the subsurface material is known, it becomes a relatively straightforward problem in geometry to calculate the depth of the reflecting interface and its angle of dip.

In marine exploration, seismograms often are highly obscured because of the presence of reverberation energy which is a multiple reflection phenomenon associated with the air-water interface and the water-sediment interface. Energy trapped in the water layer characteristically reverberates or rings thus obscuring the reflected energy which must be relied upon for delineating the subsurface stratification.

Most of the problems associated with seismic prospecting thus are not related merely to calculating the depth of the subsurface reflectors after the reflection time has been picked but rather are concerned with the identification on the seismogram of the seismic events to which computations may properly be applied.

The seismic impulse is not a simple function. On the contrary, a seismic disturbance generally is of great complexity and involves energy radiated in all directions from a sending station. Only a fraction of the energy travels downwardly along a given ray path to a reflection point from which it returns back to the earth's surface where it is detected. Seismic energy reflected upwardly from the bottom of the water layer upon arrival of the water-air boundary is again reflected. The resulting downwardly traveling energy thus gives rise to the reverberation phenomenon. The multiple involved with the water layer is the most significant multiple encountered in seismic exploration and is often present. The problem to which the present invention is directed is to identify and remove the unwanted multiple energy from a seismogram so that the reflection signals can then be reliably identified.

At the present stage of development of seismic exploration, seismic signals are recorded in phonographically reproducible form, as on magnetic tape, in which case the signals may be reproduced as electrical signals and processed in accordance with various criteria to render less difficult the proper interpretation of the data. One of the methods of processing seismic data for improving the reliability of interpretation has been to apply crosscorrelation and autocorrelation techniques in order to identify the coherent reflection signal properties therein.

The present invention is directed to eliminating the reverberation energy, and employs a filter produced by crosscorrelating and autocorrelating the seismic signal in order to generate the filter.

In one aspect, a prediction error filter is applied to the seismic signal to produce an output signal free from the reverberation energy.

An autocorrelation function X of a truncated time segment or data gate of a seismic trace or information signal is generated for a plurality of delay intervals. A crosscorrelation function Z is generated for a like plurality of delay intervals where the crosscorrelation is between the truncated data gate undelayed on one hand and on the other hand gapped or delayed a time interval on the order of the reflection time of energy traveling from the sending station to the bottom of the water layer and back to the receiving station and over a time gate, the truncation of which preferably is modified in accordance with a selected ramp function. The information signal is then filtered with a time domain filter ($Y_m$) having relationships such as are expressed in the solution of the matrix equation $XY=Z$. The filter output, delayed by the reverberation time, is subtracted from the trace.

For a more complete understanding of the present invention and for further objects and advantages thereof, reference may now be had to the following description taken in conjunction with the accompanying drawings in which.

Figure 1:
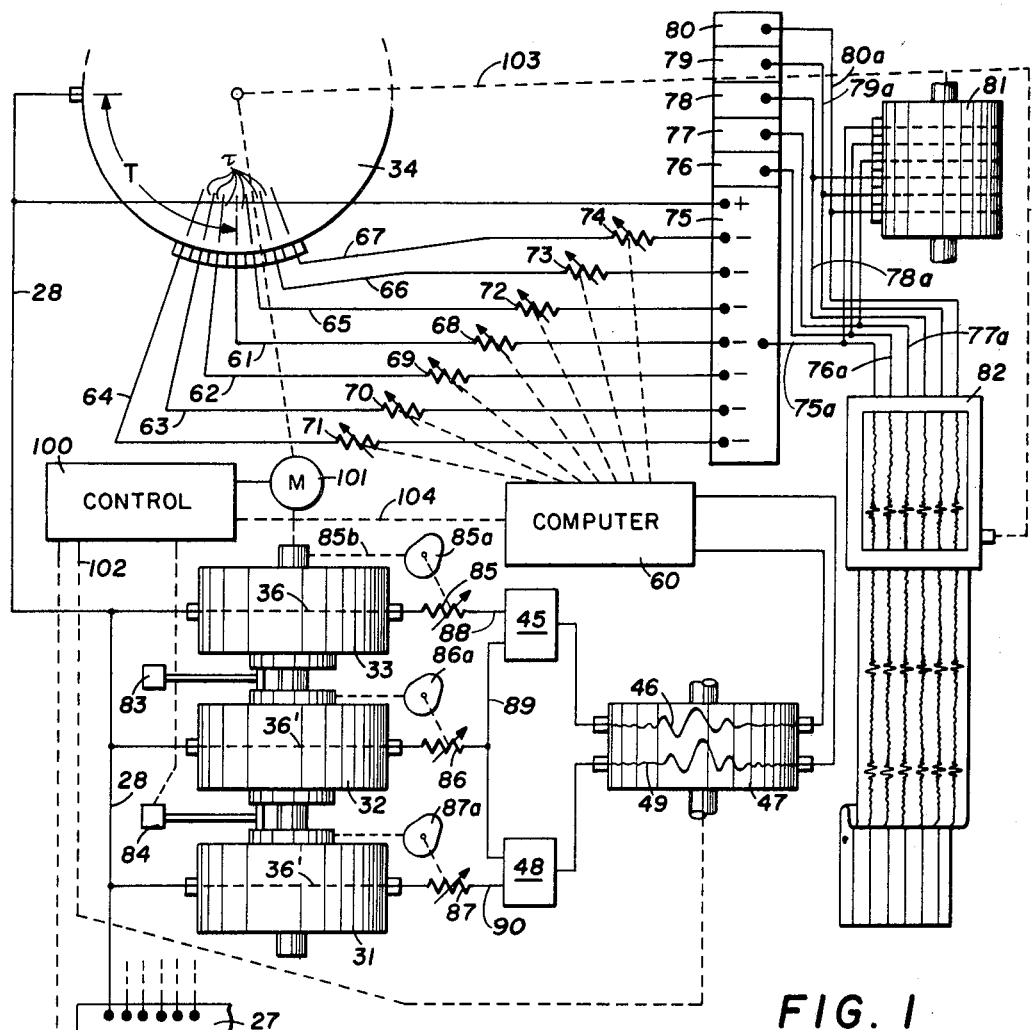
FIG. 1 is a diagrammatic view of a system embodying the present invention.
Figure 1:
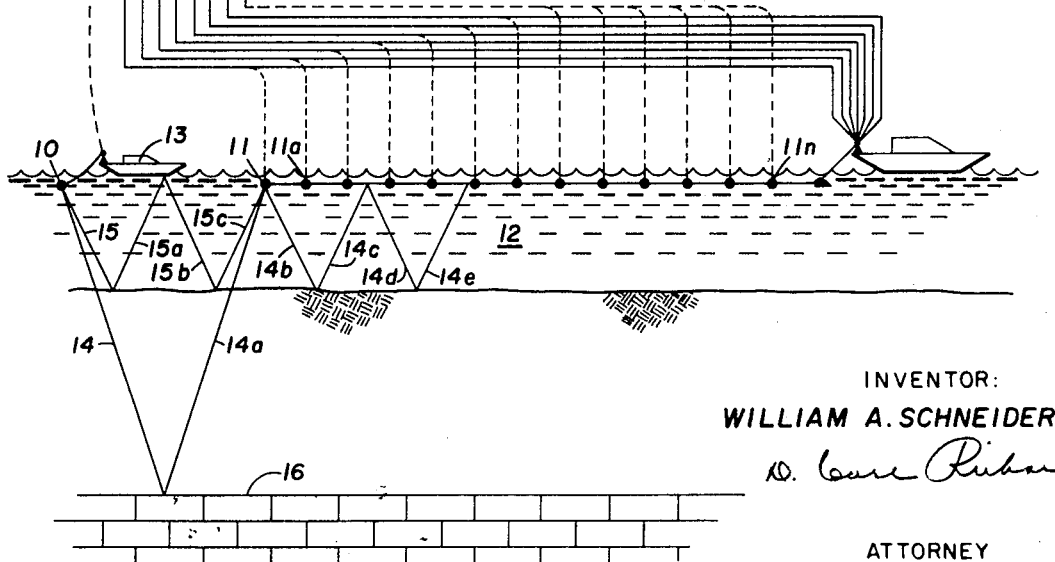

Referring now to FIG. 1, the problems to which the invention is directed are illustrated by considering the travel path of energy from explosive 10 as detected by a seismic detector 11. In usual practice, a charge of dynamite is detonated at predetermined depth in the water layer 12 by actuation of a blaster on a boat 13 to initiate seismic waves which travel in all directions from the source 10. The ray paths 14 and 14a represent the primary reflection paths to and from a subsurface reflector 16. Ray paths 14b, 14c, 14d, and 14e represent reverberation paths in the water layer 12. Multiple energy travels along path 15 to the bottom of the water layer where it is reflected back to the water-air interface as along path 15a, where it is again reflected downward. The energy then travels to the bottom of the water layer by way of path 15b and back again to the surface by way of path 15c. The arrival at the surface of layer 12 of primary reflection energy traveling along path 14a also generates reverberations in the water layer as represented by paths 14b, 14c, 14d, 14e, etc. Thus, unwanted reverberation energy generally may be present over record times wherein wanted signals arrive.

ANALOG SYSTEM

For the purpose of the present description, the relatively simple physical problem thus presented will be employed, and the signal output from the single detector 11 will be treated in detail. It should be kept in mind, however, that ordinarily a seismic spread includes many detectors, such as detectors 11a–11n. A multielement marine cable is employed so that a suite of seismic signals will be produced to aid in determining the presence of energy reflected from various depths.

Reflected energy may be identified by reason of the coincidence in the time occurrence of like high-amplitude signals. Output signals from the spread detectors 11a–11n are applied to an amplifier system 27 and then are stored for processing. The output signal from the detector 11 will now be considered in detail with the understanding that signals from the remaining detectors will similarly be processed. The output signal from detector 11 is applied by way of conductor 28 to a processing system which, in the form illustrated, includes four drum storage units 31–34.

Figure 2:
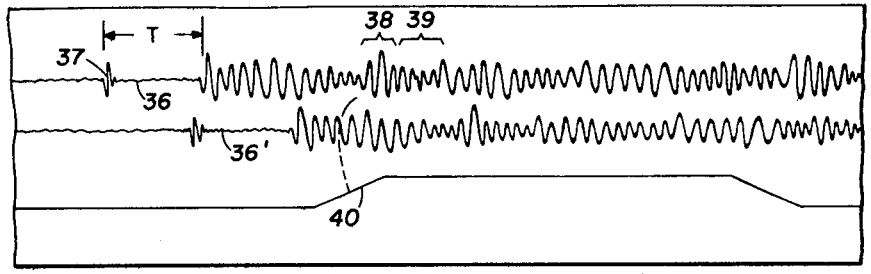
FIG. 2 is a time plot of a signal from one of the detectors of FIG. 1 illustrating the initial displacement for correlation processing.

In the analog process employed in FIG. 1, the signal from detector 11 may be of the type illustrated by signal 36, FIG. 2. The instant of generation of the seismic pulse, which is the instant of the detonation of the explosive charge 10, is represented by the time break pulse 37. The primary energy traveling along path 14 may be represented by the reflection energy 38. The reflection energy is mixed with unwanted reverberation or noise. The signal 36 is stored on the drums 31–33. The same signal 36 may also be stored on drum 34.

The signals stored on drums 31–33 are employed for the purpose of synthesizing a filter which will selectively attenuate the reverberation energy 39 with minimum attenuation of the reflection 38. Synthesis of a proper cross-equalization filter involves the autocorrelation of the signal 36 and the crosscorrelation thereof with the same signal shifted by a time interval roughly equal to the travel time of a pulse from source 10 to the bottom of the water layer 12 and back to detector 11. Such a shift has been illustrated in FIG. 2 with the signal 36' being shown displaced in time relative to signal 36 by a time shift T. The signal 36' is thus shifted on both drums 31 and 32.

It should be kept in mind that the primary reflection 38 and the reverberation energy are combined with other signal and noise components so that in general they do not appear on a seismogram as separate events. As is often the case, the reverberation occurs at a record time which is substantially coincident with a primary reflection from a subsurface bed. The elimination of the reverberation permits the reflection to be displayed free or unmasked by the unwanted noise.

The crosscorrelation function of truncated data gates from signals 36 and 36' is produced at the output of multiplier-integrator 45 and the resultant crosscorrelation function 46 is stored on a drum 47. The autocorrelation function 49 of a truncated data gate of signal 36' is produced from signals stored on both drums 31 and 32. Function 49 is produced at the output of multiplier 48 and is stored on drum 47. The crosscorrelation and autocorrelation operations for producing the functions 46 and 49 are carried out over the data gate 40, FIG. 2, for the time delays $-\tau_n$ to $+\tau_n$.

Crosscorrelation and autocorrelation operations in general are well known in the treatment of seismic signals, and, for this reason, the systems have been shown in block form. The systems may be of the analog type represented in FIG. 1 with a more general description being found in U.S. Pat. No. 2,927,656, columns 5 and 6, and in U.S. Pat. No. 3,131,375. The present invention involves the use of the correlation operations for locating, characterizing and eliminating the multiple energy.

In accordance with the invention, selected truncated time segments of the undelayed signal 36 and the delayed signal 36 are employed for correlation operations. Truncation is accomplished in the system of FIG. 1 by employing potentiometers 85, 86, and 87. The potentiometer 85 is actuated by cam 85a which is driven cyclically by way of linkage 85b coupled to the shaft of the drum 33. Thus, as the undelayed trace 36 is cyclically reproduced, the cam 85a cyclically alters the potentiometer 85 to select a time segment of the trace 36 characterized by the presence of the reverberation energy. Preferably, the data gate of truncated time segment will be of substantial length in order to evaluate as realistically as possible the nature of the reverberation energy. As illustrated in FIG. 2, the data gate would extend from a record time of about 1 second to 3 seconds. This would be a record interval in which there is good reflection signal-to-noise ration. As above noted, each primary reflection sets off reverberations. Thus, the filter will be based upon a fairly long data gate of the unwanted reverberation energy. The data gate will be ramped on and off, with the respective ramps being of the length on the order of about 20 percent of the length of the data gate. Thus the function 40 is superimposed on the trace 36 by the potentiometer 85 under control of cam 85a. Cam 85a is shaped and indexed with reference to the information on drum 33 to produce the ramped gate shown in FIG. 2.

In a similar manner, potentiometer 86 is controlled by cam 86a and potentiometer 87 is controlled by cam 87a. By superimposing the ramped onset and termination, crosscorrelation functions and autocorrelation functions are of improved character with reference to the generation of suitable time domain filters for reverberation attenuation.

Unique filters are required to eliminate the reverberation energy from the signal 36. The crosscorrelation functions and autocorrelation functions are employed to synthesize the filter. The correlation functions are fed into a computer 60 which sets the values, for example, of resistances 68–74 in the output lines 61–67 leading from the storage drum 34 which serves as an element of a time domain filter.

With the signal 36 stored on the drum 34 for playback purposes, the computer 60 determines the weights of the signals to be summed in an output unit 75. The output from unit 75 may then be either stored in reproducible form on a storage drum 81, or recorded as a wiggle trace or other visible recording produced by recorder 82.

As described thus far, only the signal from detector 11 has been referred to. As above noted, 12-trace and 24-trace recordings are conventionally employed. In the present case, the drums 31–34 may be multiple channel drums so that signals from detectors 11a–11n may be treated. The computer 60 would be employed successively to evaluate and synthesize the filters in the additional channels (not shown) leading from the delay line drum 34 to the summing units 76–80. The outputs of summing units 76–80 are applied to the storage unit 81 and to the recorder 82 by way of channels 76a–80a. It is to be understood that the drums 31–34, 47, and 81 have been included in order to illustrate the functions involved. Some of the functions of FIG. 1 may be combined on or carried out in connection with use of a single drum without departing from the teachings of the present invention. Furthermore, while an analog system has been described, it is to be understood that the signals may be stored in registers in digital computer storage systems rather than on drums 31–34.

The generation of the seismic waves, as by detonation of the explosive charge 10, may be taken illustrative of well-known techniques. The generation of the seismic waves may be under the supervisory control of a unit 100 which controls the operations of the storage drums 31–34, computer 60, and the drums 47, 81 and recorder 82. By this means, the signals may be recorded in predetermined relation to the position of the drums 31–34. Such control systems are well known, a representative system being described in U.S. Pat. No. 3,039,558 to Romberg.

Spread corrections may be introduced into the recording operation prior to the correlation operations. Spread corrections wherein both static and dynamic variables are compensated are made in accordance with well-known procedures. Such corrections are described in *Geophysics*, Vol. XV, Apr. 1950, page 227 et seq. in a paper entitled "-Compensation Charts for Linear Increase of Velocity with Depth" by W. B. Agocs. A mechanism for applying spread corrections is disclosed in U.S. Pat. No. 3,092,805 to Koeijmans and in U.S. Pat. No. 2,948,880 to Thatcher. Since control and correction operations are generally well known, they are not described in detail herein.

As shown in FIG. 1, the control unit 100 is connected as to energize the motor 101 which may produce uniform rotation of the drums 31–34 and 81. The control unit 100 is coupled by way of linkage 102 to time shifting units 83 and 84 and to the drive for the drum 47. The linkage 102 is a stepping linkage to shift drum 32 relative to drum 33 an increment $\tau$ at the beginning of each playback cycle. Drum 31 is shifted relative to drum 32 by a similar increment. By this means, the points on the correlation functions 46 and 49 may be stored on drum 47 which is stepped synchronously with the shifting units 83 and 84.

The linkage 103 leading to drum 81 and recorder 82 may be actuated only when the time domain filter operation is to be carried out following the synthesis of the time domain filters. However, the linkage has been shown unbroken merely for the purpose of indicating the coordination between the several drums involved. The linkage 104 couples control unit 100 to the computer 60 for coordination of the synthesis of the filter weights.

In producing the correlation functions 46 and 49, the signals from detector 11 initially are recorded on drums 31–34. The drums 31 and 32 are then both shifted in their time axis relative to drum 33 as by operation of the shifting unit 83 by a time interval about equal to the two-way travel time in water layer 12 (T of FIG. 2). Thereafter, the signals 36 and 36' are cyclically reproduced. During a first cycle, the signals appearing on the output lines 88 and 89 are multiplied and the product is integrated in unit 45 over the length of the time gate 40, FIG. 2, to produce one point on the crosscorrelation function 46. Similarly, signals on the lines 89 and 90 are multiplied and integrated in the unit 48 to produce one point on the autocorrelation function 49. Prior to the second cycle, the shifting units 83 and 84 are actuated to shift the drums by a time increment $\tau$. During the second cycle, a second point on the crosscorrelation function 46 and a second point on the autocorrelation function 49 are determined. The drums are then successively shifted by increments of $\tau$ to cover the entire delay range. The time increment $\tau_n$ may be within the range of from 1 to 5 milliseconds and preferably is of the order of about 2 milliseconds but may vary depending upon the frequency bandwidth desired.

In general, the signal channels leading from the drum 34 will be spaced in increments of $\tau$. The computer 60 will evaluate, for each of the delay intervals, the weight for one of the signals to be included in the input to the summing unit 75. The signal on channel 28 is also applied to summing unit 75 undelayed and will be of a first relative polarity. The signals on channels 61–67 will be of opposite relative polarity and delayed in time by intervals of $T \pm \tau_n$ so that there will be subtracted from the signal on trace 36 a predicted signal representative of the reverberation energy 39. Substantial reduction in reverberation energy will thus be accomplished. The resultant signal then appears on output channel 75a leading to units 81 and 82.

Having briefly described the analog system of FIG. 1 and having outlined the objectives for the use of this system, it may be helpful at this point to describe mathematically the operations involving the use of the crosscorrelation function and the autocorrelation function stored on drum 47. For this purpose, the following theoretical analysis is set forth. Thereafter, the implementation of such theory to a simplified analog time domain filter will be described.

VERIFICATION

The action of the water layer is to cause the primary reflections or signal to be multiply reflected many times between the water bottom and water surface. Mathematically, this effect can be characterized as:

$$f(t)=s(t)+2s(t-T)*h(t)+3s(t-2T)*h(t)*h(t) \ldots (k+1)s(t-kT)h(t)*h(t)*h(t)\ldots*h(t) \quad (1)$$

or:

$$f(t) = \sum_{k=0}^{\infty} (k+1)s(t-kT)*h^k(t) \quad (2)$$

where:

$f(t)$ = recorded seismogram;
$s(t)$ = primary reflection sequence;
$T$ = two-way travel time in water layer;
$h(t)$ = water bottom reflection response;
* = convolution; and
$h^k(t) = h(t)$ convolved with itself $k$ times.

In equation (1) the first term $s(t)$ of the infinite series represents the desired signal whereas all remaining terms are the "reverberation tail." The process described herein is for eliminating the reverberation tail. Clearly, if $h(t)$ were known, then the inverse filter could be applied directly as $$g(t)=\delta(t)-2h(t-T)+h(t-2T)*h(t-2T) \quad (3)$$

where:

$\delta(t)$ = unit impulse function.

Convolution of $g(t)$ with $f(t)$ of equation (1) yields $s(t)$ exactly:

$$g(t)*f(t)=s(t) \quad (4)$$

This inverse may be estimated from the recorded trace $f(t)$ by first evaluating the filter which transforms $f(t)$ into $f(t+T)$, or evaluating the prediction operator for prediction distance $T$. This leads to matrix equation:

$$XY=Z \quad (5)$$

where:

Y is the filter.

$$f(t)*Y(t)=f(t+T) \quad (6)$$

For $f(t)$ given by equation (1), the filter Y is:

$$Y(t)=2h(t)-h(t-T)*h(t-T) \quad (7)$$

Next, delay the predicted trace by $T$ seconds and subtract it from the original field trace $f(t)$ to yield the prediction error trace:

Prediction error output $= f(t)-f(t-T)*Y(t-T) \quad (8)$ $$=f(t)*[\delta(t)-\delta(t-T*Y(t-T)] \quad (9)$$

However, the bracketed term is just $g(t)$ of equation (3). Therefore, the prediction error filter obtained from $Y(t)$ as $$\delta(t)-Y(t-2T) \quad (10)$$

is also the exact inverse filter to remove reverberations.

The filter represents the least-mean-square estimate of the transfer function relating primary energy with its reverberation. The filtered signal is delayed by the travel time from the point of generation to the water bottom and returned to the detector location and is then subtracted from the original signal yielding a reverberation-free trace.

ANALOG SYSTEM-CONTINUED

The filtering operation illustrated in FIG. 1 involves a time domain filter unit including drum 34 in which the amplitude of the signal from each of the pickup points on the storage drum is selectively attenuated by units 68–74, following which the signals are summed in unit 75. A servosystem in computer 60 may be employed to adjust units 68–74, such as in the magnetic delay line filter described by Hal J. Jones et al. in a paper entitled "Magnetic Delay Line Filtering," in *Geophysics*, Vol. XX, Oct. 1955, page 745 et seq. In the latter case, the components of the signal are controlled in amplitude by a variable resistance in each signal line. Alternatively, an amplifier may be substituted for variable resistors 68–74 and the gains of the amplifiers may be controlled by gain control voltages generated in the computer 60. Such gain control voltages from the computer 60 produced from treatment of the crosscorrelation and autocorrelation functions may thus be used to control the weights of signals on channels 61–67.

COMPUTER 60

The computer 60 and its mode of operation may best be understood by referring to the relationships expressed in equation (5) which indicated that the autocorrelation signal X, when treated by a filter $Y_m$, will result in a crosscorrelation signal Z. Computer 60 inverts the matrix X and solves the resulting expression for the seven values or weights to be given the signals applied to the summing unit 75. By way of example, equation (5) in matrix form for a seven-point operator or filter $Y_m$ may be written:

$$\begin{bmatrix} X0 & X1 & X2 & X3 & X4 & X5 & X6 \\ X(-1) & X0 & X1 & X2 & X3 & X4 & X5 \\ X(-2) & X(-1) & X0 & X1 & X2 & X3 & X4 \\ X(-3) & X(-2) & X(-1) & X0 & X1 & X2 & X3 \\ X(-4) & X(-3) & X(-2) & X(-1) & X0 & X1 & X2 \\ X(-5) & X(-4) & X(-3) & X(-2) & X(-1) & X0 & X1 \\ X(-6) & X(-5) & X(-4) & X(-3) & X(-2) & X(-1) & X0 \end{bmatrix} \begin{bmatrix} Y(-3) \\ Y(-2) \\ Y(-1) \\ Y0 \\ Y1 \\ Y2 \\ Y3 \end{bmatrix} = \begin{bmatrix} Z(-3) \\ Z(-2) \\ Z(-1) \\ Z0 \\ Z1 \\ Z2 \\ Z3 \end{bmatrix}$$

$$(12)$$

where:

$X0$, $X(-1)$, $X(-2)$, $X(-3)$, $X(-4)$, $X(-5)$, $X(-6)$, $X1$, $X2$, $X3$, $X4$, $X5$, and $X6$ are the numerical values of the autocorrelation function 49 at a time delay $\tau=0,-1,-2,-3,-4,-5,-6,1,2,3,4,5$, and 6, respectively;

$Z0$, $Z(-1)$, $Z(-2)$, $Z(-3)$, $Z1$, $Z2$, and $Z3$ are the numerical values of the crosscorrelation function 46 at time delays $\tau=0,-1,-2,-3,1,2$, and 3 respectively.

As to the remaining elements of the matrix $Y(-1)$, $Y(-2)$, $Y(-3)$, $Y0$, $Y1$, $Y2$, and $Y3$ are the filter weights of the elements in lines 61, 62, 63, 64, 65, 66, and 67, respectively.

In order to solve equation (12) for the values of the filter points at a delay intervals $\tau=(-3),(-2),(-1),0,1,2$, and 3, the X matrix of equation (12) is inverted and the solution is then formulated for each of the seven filter points. The operation mathematically is indicated in equation (13).

$$\begin{bmatrix} Y(-3) \\ Y(-2) \\ Y(-1) \\ Y0 \\ Y1 \\ Y2 \\ Y3 \end{bmatrix} = [X]^{-1} \begin{bmatrix} Z(-3) \\ Z(-2) \\ Z(-1) \\ Z0 \\ Z1 \\ Z2 \\ Z3 \end{bmatrix} \quad (13)$$

The inversion of equation (12) to equation (13) may be undertaken in accordance with any one of several well-known techniques, of which the Crout reduction technique is exemplary. This technique is described and applied in *Methods of Applied Mathematics*, by F. B. Hildebrand, Prentice-Hall, Inc. (1958), Appendix, pages 503–507. The brute force method of inversion will be described below in connection with FIG. 4. By such means, the unknown $Y_m$ quantities may be evaluated for each delay interval of interest. More particularly, signals are produced, one for each delay interval, and are applied to units 68–74, FIG. 1, to control the amplitudes of the signals from delay line drum 34 prior to addition in unit 75. Where a delay interval $\tau=0.002$ second is employed in the production of the crosscorrelation function 46 and the autocorrelation function 49, the spacing of detector heads on drum 34 will be equal to 0.002 second record time.

DIGITAL OPERATION-FIG. 3

Figure 3:
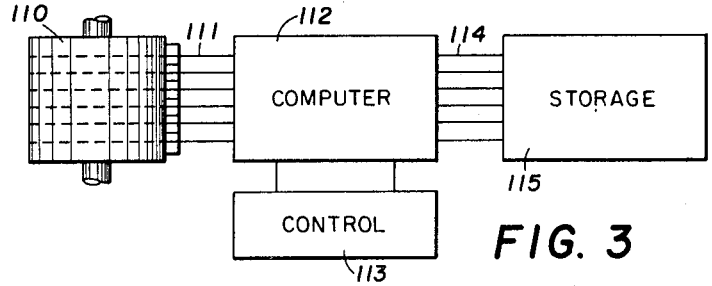
FIG. 3 illustrates a digital filter process.

Operations generally involve 12- and 24-trace recordings, and time delay filters having as many as 25 or more delay intervals or points are required. It will be apparent that, for such operations, the matrix of equation (12) becomes very large. Such large matrices are most expeditiously evaluated and filter point signals produced in digital computers having large data-handling capacity. In FIG. 3, multitrace seismic data is stored on drum 110 and is reproduced and applied by way of channels 111 to computer 112. The computer 112 is programmed under the control of a unit 113 to determine, adjust or fix the filter corresponding with the solution to equation (5). The computer 112 will then produce on output channels 114 the filtered seismic signals. The latter signals are then applied to a storage unit 115 shown in the form of a magnetic drum storage unit. Storage may be temporary electronic storage, or alternative forms of readout may be employed, including the production of a visible or wiggle trace seismogram.

The operation may be carried out in the system of FIG. 3 in accordance with well-known systems and methods of operating the same but guided by the requirements of the method set forth herein. Digital filtering, in general, is well known as indicated in "Principles of Digital Filtering" by Robinson and Treitel, *Geophysics*, Vol. XXIX, No. 3, June 1964, pages 395–404. Thus, the control unit 113 of FIG. 3 may readily be programmed to carry out the operation indicated in equation (5).

While the analog filtering operation illustrated in FIG. 1 may be employed, when large sets of data and the multipoint filters are involved, a digital computer operation will be preferred.

ANALOG FILTER SYNTHESIS-FIG. 4

Figure 4:
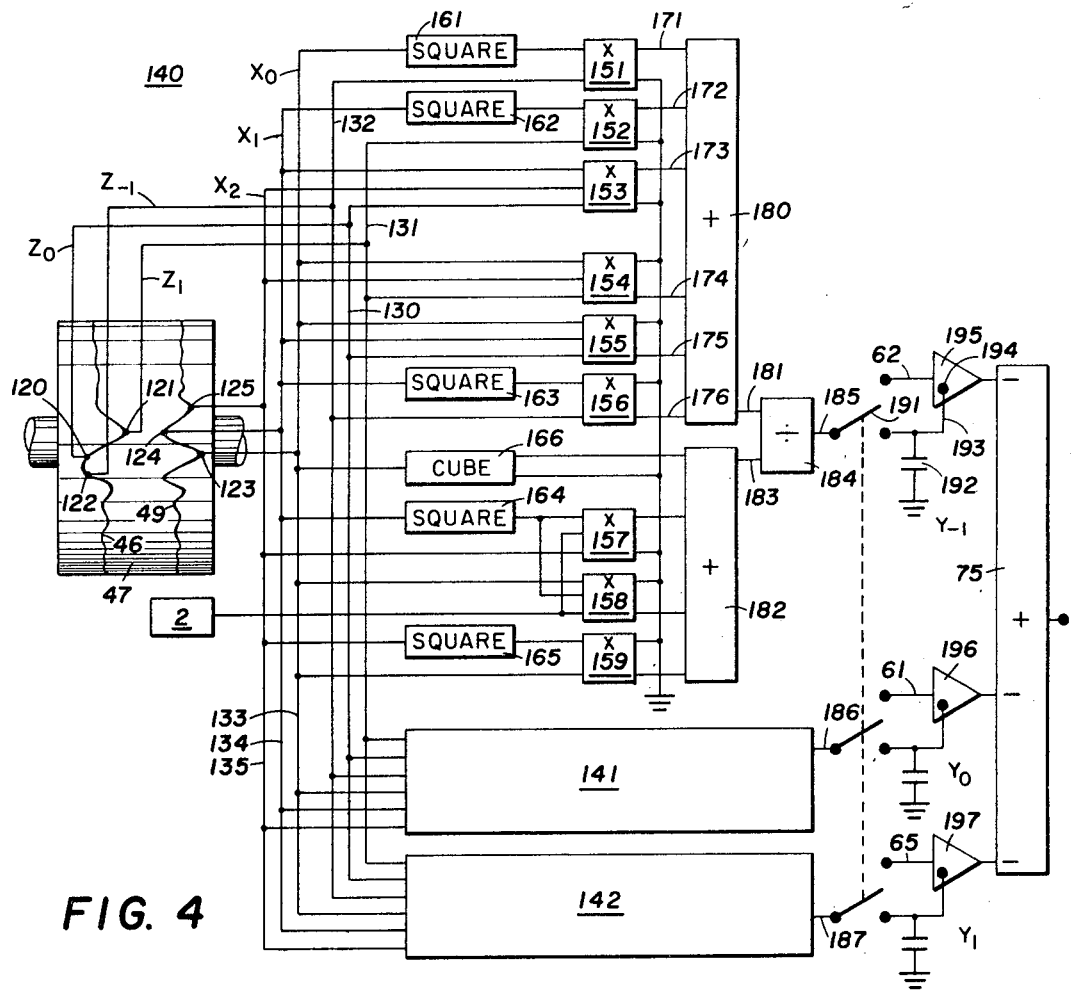
FIG. 4 illustrates one form of the analog computer of FIG. 1.

In order to illustrate further the operation of the computer of FIG. 3, as well as to explain further the invention, the analog computer operation is further developed in FIG. 4. The computer 60 of FIG. 1 may take the form illustrated in FIG. 4 for a simplified three-point filter. The same principles illustrated in FIG. 4 would be involved for the seven-point filter of FIG. 1 or for more complex filters.

The crosscorrelation function 46 and the autocorrelation function 49 are stored on drum 47. For the purpose of the description of FIG. 4, representations of the crosscorrelation function 46 and the autocorrelation function 49 have been illustrated together with pickup devices for reproducing the data stored on the drum 47. The pickup 120 produces a signal representative of the crosscorrelation function at time $\tau=0$ for the function $Z0$ of equation (12). The signals from pickups 121 and 122 correspond with the elements $Z1$ and $Z(-1)$ of equation (12). Signals from pickups 123, 124, and 125 correspond with the elements $X0$, $X1$ and $X2$ of equation (12).

Since the autocorrelation function 49 is symmetrical, the values $X1$ and $X2$ correspond with the values $X(-1)$ and $X(-2)$, respectively. Thus, for a solution to equation (12), but limited to a three-point filter, the necessary correlation signal data appears on the readout busses 130–132 and 133–135.

The system of FIG. 4 serves to solve equation (12). The solution to equation (12), limited to a three-point filter, is indicated in equations (14), (15) and (16) which are the same as would be obtained by using the Crout reduction technique. Equation (14) defines the magnitude of the signal to be applied from channel 62, FIG. 1, to summing unit 75. Equation (15) represents the magnitude of the signal to be applied by way of channel 61, and equation (16) represents the relative magnitude of the signal to be applied by way of channel 65.

$$Y(-1) = \frac{\begin{bmatrix} Z(-1) & X1 & X2 \\ Z0 & X0 & X1 \\ Z1 & X1 & X0 \end{bmatrix}}{\begin{bmatrix} X0 & X1 & X2 \\ X1 & X0 & X1 \\ X2 & X1 & X0 \end{bmatrix}} \quad (14)$$

$$Y0 = \frac{\begin{bmatrix} X0 & Z(-1) & X2 \\ X1 & Z0 & X1 \\ X2 & Z1 & X0 \end{bmatrix}}{[D]} \quad (15)$$

$$Y1 = \frac{\begin{bmatrix} X0 & X1 & Z(-1) \\ X1 & X0 & Z0 \\ X2 & X1 & Z1 \end{bmatrix}}{[D]} \quad (16)$$

$$Y(-1) = \frac{[X0^2 Z(-1) + X1^2 Z1 + X1 X2 Z0 - Z1 X0 X2 - X1 X0 Z0 - Z(-1) X1^2]}{[D]} \quad (17)$$

where:

$$D = [X0^3 + 2X1^2 X2 - 2X0X1^2 - X0X2^2]$$

$$Y0 = \frac{[X0^2 Z0 + Z(-1) X1 X2 + X1 X2 Z1 - X2^2 Z0 - X0 X1 Z(-1) - X0 X1 Z1]}{[D]} \quad (18)$$

$$Y1 = \frac{[X0^2 Z1 + X1 X2 Z0 + X1^2 Z(-1) - X0 X2 Z(-1) - X1^2 Z1 - X0 X1 Z0]}{[D]} \quad (19)$$

The operations illustrated in FIG. 4 for solving equations (17)–(19) may readily be performed for an inverted matrix by analog means so long as accuracy is maintained. Only addition, multiplication and division of voltages are involved in the operation of the computer of FIG. 4. The solutions to equations (14)–(16), expressed in equations (17)–(19), should be considered along with FIG. 4. The portion of the computer of FIG. 4 for computing the value of the filter point $Y(-1)$ has been illustrated in detail in the channel 140 of FIG. 4. Channels 141 and 142 are employed for obtaining the values for the filter points $Y0$ and $Y1$.

Channel 140 involves nine multipliers 151-159. The units 151-156 and the associated circuits are employed to provide the solution to the numerator of equation (17). The multipliers 157-159 are employed to provide a solution to the denominator of equation (17).

A squaring unit 161 is connected to one input of the multiplier 151. A squaring unit 162 is connected to one input of the multiplier 152. A squaring unit 163 supplies one input of multiplier 156. A squaring unit 164 supplies one input of multiplier 157, and a squaring unit 165 supplies one input of multiplier 159. A unit 166 produces an output which is the cube of the input signal applied thereto.

The input to the squaring unit 161 is connected to the X0 bus 133. The second input to the multiplier 151 is connected to $Z(-1)$ bus 132. Thus, there is produced an output on line 171 proportional to the quantity $X0^2 Z(-1)$.

The input to the squaring unit 162 is connected to the X1 bus 134. The second input to the multiplier 152 is connected to the Z1 bus 131. Thus, there is produced on output line 172 a voltage representative of the quantity $X1^2 Z1$ of equation (17).

In a similar manner, the output on line 173 is produced representing the third element of the numerator of equation (17), namely the quantity X1X2Z0. The voltage on line 174 is produced representative of the fourth element of the numerator of equation (17), namely the quantity Z1X0X2. The voltage on line 175 is representative of the fifth element of the numerator of equation (17), namely the quantity X1X0Z0. The signal on line 176 is representative of the sixth or last element of the numerator of equation (17), namely the quantity $Z(-1)Xb[2$.

It will be noted that the voltages on lines 174, 175 and 176 are applied to a summing unit 180 with a polarity which is opposite that of the voltages on lines 171-173. Thus, the output from the summing unit 180 appearing on the channel 181 is representative of the value of the numerator of equation (17).

Voltages are applied from the cube unit 166 and the multipliers 157, 158 and 159 to a summing unit 182. The output voltage from the summing unit 182 appearing on channel 183 represents the denominator of equation (17). The signals on channels 181 and 183 are applied to a dividing unit 184. Thus, the output of the unit 184, as appearing on output channel 185, represents the solution to equation (17).

The solution to equation (18) is represented by a voltage appearing on the output channel 186 of the computer channel 141. A voltage representing the solution to equation (19) appears on output channel 187 of the computer channel 142.

The channel 185 is connected by way of a switch 191 to a storage capacitor 192 which is connected to ground and, by way of a conductor 193, to a gain control input terminal 194 of an amplifier 195. In this system, an amplifier 195 in line 62 replaces the variable resistance 69 of FIG. 1 so that the signal from the delay drum 34 of FIG. 1 will be amplified in proportion to the gain control voltage stored on capacitor 192 upon closure of switch 191. In a similar manner, control voltages are applied to amplifiers 196 and 197 representing the values of the solutions to equations (18) and (19). Amplifier 196 may be considered as substituted for the impedance 68 of FIG. 1 and channel 61. The amplifier 197 may be considered as substituted for the resistance 72 in line 65 of FIG. 1. Thus, the output signals from amplifiers 195, 196 and 197 are applied to the inputs of the summing unit 75 of FIG. 1 and FIG. 4.

FILTER LENGTH

Theoretical considerations dictate that the coefficients $Y_m$ of equation (12) span a time length equal to $2\, d_w/V_w$ ($d_w$ = water depth and $V_w$ = water velocity) for complete dereverberation from a simple water bottom. The number of filter coefficients ($m+1$) required on this basis (with 10 percent increase in water depth as safety factor) is given by:

$$m+1 = 2.2\, d_w/\Delta T\, V_w \quad (20)$$

Typical water depths encountered in most marine operations range between 100 and 500 feet, giving for $m+1$:

$m+1 = 12$ for $d_w = 100$ feet
$\quad\quad = 60$ for $d_w = 500$ feet
for a 4-millisecond sample period.

THE DATA GATE

The data gate may start 100 milliseconds after the water bottom or at a time determined by the seismologist. The gate length will be chosen from the early part of the record (1 to 3 seconds) to insure the best signal-to-ambient noise ratio for reverberation parameter estimation. The data gate will include a "ramp on" of the order of 100 milliseconds and a similar "ramp off" to minimize truncation effects. The ramp preferably will be linear, as indicated in FIG. 2.

This gapped deconvolution method differs from prior operations by predicting many sample points ahead, whereas in prior operations, prediction was only one sample ahead. For water reverberations, the minimum prediction distance is the two-way water time, which is normally several tens of milliseconds. Thus, the gapped deconvolution filter is considerably more efficient in terms of fewer filter coefficients, and more effective in terms of dereverberation since better statistics are available for the fewer filter coefficients. The gapped deconvolution output will have a spectrum free from reverberation structure but will still retain the basic overall system response.

The reverberation problem is most severe in marine seismology but is not limited thereto. For example, the reverberation problem may exist in on-shore seismic prospecting wherein the area under investigation includes strong, near surface reflectors. The seismic trace produced under these circumstances includes a reverberation characteristic analogous to the water reverberation characteristic. For this reason, marine seismology as used herein may be taken to include land operations characterized by the same reverberation problem.

The term "seismic trace" as used herein refers to an electrical signal having a continuous time function (analog) such as that obtained from the output of a seismometer responsive to seismic waves or refers to an electrical signal or signals digitally representing said continuous time function or a recording of either form. The digital representation of an analog signal involves sampling the analog signal at successive points along the analog signal, which points are spaced in time according to the sampling interval $\Delta t$. The sampled values are then encoded into digital form, thereby producing a digitized seismic trace.

Having described the invention in connection with certain specific embodiments thereof, it is to be understood that further modifications may now suggest themselves to those skilled in the art and it is intended to cover such modifications as fall within the scope of the appended claims.

What is claimed is:

1. The method of reverberation suppression in marine seismic exploration which comprises:
   a. generating and detecting seismic waves in a surface water layer to produce an electrical seismic trace which includes manifestations of a primary reflection,
   b. generating by machine means an electrical autocorrelation function X over a selected truncated data gate of said trace for a plurality of delay intervals,
   c. generating by machine means an electrical crosscorrelation function Z for said plurality of delay intervals between
      i. said truncated data gate of said seismic trace, and
      ii. the same truncated data gate delayed a time interval of the order of the two-way travel time in said water layer over a data gate which includes reverberation energy in said trace,
   d. time domain filtering by machine means said trace with relative amplitudes proportional to ($Y_m$) in the matrix $X(Y_m)AQxZ$,
   e. delaying by machine means the filtered trace relative to said seismic trace by a time interval T, and f. subtracting by machine means the filtered and delayed trace from said seismic trace to suppress reverberations of said primary reflection.

2. The method of reverberation suppression in marine seismic exploration which comprises:
   a. generating and detecting seismic waves in a surface water layer to produce an electrical seismic trace which includes manifestations of a primary reflection, and
   b. causing an automatically operable system to perform the steps of
      i. generating an autocorrelation function X over a selected truncated data gate of said trace for a plurality of delay intervals,
      ii. generating an electrical crosscorrelation function Z for said plurality of delay intervals between said truncated data gate of said seismic trace, and the same truncated data gate delayed a time interval of the order of the two-way travel time in said water layer over a data gate which includes reverberation energy in said trace,
      iii. time domain filtering said trace with relative amplitudes proportional to ($Y_m$) in the matrix $X(Y_m)=Z$,
      iv. delaying the filtered trace relative to said seismic trace by a time interval T, and
      v. subtracting the filtered and delayed trace from said seismic trace to suppress reverberations of said primary reflection.

3. The method of reverberation suppression in marine seismic exploration which comprises:
   a. generating and detecting seismic waves in a surface water layer to produce an electrical seismic trace which includes manifestations of a primary reflection, and
   b. operating an automatic data processing machine to perform the steps of
      i. generating an electrical autocorrelation function X over a selected truncated data gate of said trace for a plurality of delay intervals,
      ii. generating an electrical crosscorrelation function Z for said plurality of delay intervals between said truncated data gate of said seismic trace, and the same truncated data gate delayed a time interval of the order of the two-way travel time in said water layer over a data gate which includes reverberation energy in said trace,
      iii. time domain filtering said trace with relative amplitudes proportional to ($Y_m$) in the matrix $X(Y_m)=Z$,
      iv. delaying the filtered trace relative to said seismic trace by a time interval T, and
      v. subtracting the filtered and delayed trace from said seismic trace to suppress reverberations of said primary reflection.

4. The method according to claim 3 in which said truncated data gate is ramped from zero to unity at the onset and from unity to zero at its termination within predetermined time intervals.

5. The combination set forth in claim 4 wherein said ramped onset and termination extends for about 20 percent of the length of said data gate.

6. The system for reverberation suppression in marine seismic exploration which comprises:
   a. means for generating and detecting seismic waves in a surface water layer to produce an electrical seismic trace which includes manifestations of a primary reflection,
   b. machine means for generating an autocorrelation function X over a selected truncated data gate of said trace for a plurality of delay intervals,
   c. machine means for generating a crosscorrelation function Z for said plurality of delay intervals between said truncated data gate of said seismic trace, and the same truncated data gate delayed a time interval of the order of the two-way travel time in said water layer over a data gate which includes reverberation energy in said trace,
   d. machine means for time domain filtering said trace with relative amplitudes proportional to ($Y_m$) in the matrix $X(Y_m)AQxZ$,
   e. machine means for delaying the filtered trace relative to said seismic trace by a time interval T, and
   f. machine means for subtracting the filtered and delayed trace from said seismic trace to suppress reverberations of said primary reflection.

7. The system as set forth in claim 6 wherein each of said machine means is automatically operable.

8. The method of suppressing reverberation energy in marine seismic exploration which comprises:
   a. generating seismic waves in a surface water layer at a sending station and receiving the seismic waves at a receiving station spaced from said sending station,
   b. generating and storing an electrical seismic trace representative of the received seismic waves in at least two independently reproducible forms,
   c. generating by machine means a plurality of electrical autocorrelation coefficients X for a first truncated data gate of said seismic trace characterized by the presence of reverberation energy for a plurality of incremental time delays from minus $\tau_n$ to plus $\tau_n$ where $n$ is an integer,
   d. generating by machine means a plurality of electrical crosscorrelation coefficients between said first data gate and a second similar data gate a time T later in said trace where T is about the travel time of seismic energy from said sending station to the water bottom and back to said receiving station,
   e. reproducing and time domain filtering by machine means said seismic trace in accordance with a cross-equalization filter ($Y_m$) as defined by the matrix ($Y_m)=(X)^{-1}Z$, and
   f. reproducing said seismic trace and subtracting from it by machine means said filtered trace delayed by a time T relative to said seismic trace to produce an electrical seismic trace wherein reverberation energy is suppressed.

9. The method of suppressing reverberation energy in marine seismic exploration which comprises:
   a. generating seismic waves in a surface water layer at a sending station and receiving the seismic waves at a receiving station spaced from said sending station,
   b. generating and storing an electrical seismic trace representative of the received seismic waves in at least two independently reproducible forms, and
   c. causing an automatically operable system to perform the steps of
      i. generating a plurality of electrical autocorrelation coefficients X for a first truncated data gate of said seismic trace characterized by the presence of reverberation energy for a plurality of incremental time delays from minus $\tau_n$ to plus $\tau_n$ where $n$ is an integer,
      ii. generating a plurality of electrical crosscorrelation coefficients between said first data gate and a second similar data gate a time T later in said trace where T is about the travel time of seismic energy from said sending station to the water bottom and back to said receiving station,
      iii. reproducing and time domain filtering said seismic trace in accordance with a cross-equalization filter ($Y_m$) as defined by the matrix ($Y_m)=(X)^{-1}Z$, and
      iv. reproducing said seismic trace and subtracting from it said filtered trace delayed by a time T relative to said seismic trace to produce an electrical seismic trace wherein reverberation energy is suppressed.

10. A system for suppressing reverberation energy in marine seismic exploration which comprises:
    a. means for generating seismic waves in a surface water layer at a sending station and receiving the seismic waves at a receiving station spaced from said sending station,
    b. means for generating and storing an electrical seismic trace representative of the received seismic waves in at least two independently reproducible forms,
    c. means for generating a plurality of electrical autocorrelation coefficients X for a first truncated data gate of said seismic trace characterized by the presence of reverberation energy for a plurality of incremental time delays from minus $\tau_n$ to plus $\tau_n$ where $n$ is an integer, d. means for generating a plurality of electrical crosscorrelation coefficients between said first data gate and a second similar data gate a time T later in said trace where T is about the travel time of seismic energy from said sending station to the water bottom and back to said receiving station,
e. means for reproducing and time domain filtering said seismic trace in accordance with a cross-equalization filter ($Y_m$) as defined by the matrix ($Y_m$)=$(X)^{-1}Z$, and
f. means for reproducing said seismic trace and subtracting from it said filtered trace delayed by a time T relative to said seismic trace to produce an electrical seismic trace wherein reverberation energy is suppressed.

11. The method of time domain filtering by automatic machine means an electrical seismic trace representing seismic motion at a marine receiving station following creation of a seismic disturbance at a marine sending station which comprises:
   a. reproducing said trace on a plurality of channels with uniform delays therebetween where said time delays are positive and negative relative to an intermediate one of said channels,
   b. weighting the output of each of said channels and summing said outputs to produce a sum trace, said weightings having relative values corresponding with the cross-equalization filter relating a truncated data gate of said seismic trace characterized by the presence of reverberation energy to a similar truncated data gate of said seismic trace later in time by about T the travel time of seismic energy from said sending station to the water bottom and back to said receiving station,
   c. reproducing said seismic trace,
   d. reproducing said sum trace delayed relative to said seismic trace by a time T, and
   e. subtracting said delayed sum trace from said seismic trace to produce a trace wherein reverberations of primary reflections present in said seismic trace are suppressed.

12. A system for time domain filtering an electrical seismic trace representing seismic motion at a marine receiving station following creation of a seismic disturbance at a marine sending station which comprises:
   a. means for reproducing said trace on a plurality of channels with uniform delays therebetween where said time delays are positive and negative relative to an intermediate one of said channels,
   b. means for weighting the output of each of said channels and summing said outputs to produce a sum trace, said weightings having relative values corresponding with the cross-equalization filter relating a truncated data gate of said seismic trace characterized by the presence of reverberation energy to a similar truncated data gate of said seismic trace later in time by about T the travel time of seismic energy from said sending station to the water bottom and back to said receiving station,
   c. means for reproducing said seismic trace,
   d. means for reproducing said sum trace delayed relative to said seismic trace by a time T, and
   e. means for subtracting said delayed sum trace from said seismic trace to produce a trace wherein reverberations of primary reflections present in said seismic trace are suppressed.

* * * * *